United States Patent [19]

Benard et al.

[11] 4,434,492
[45] Feb. 28, 1984

[54] METHOD AND APPARATUS FOR IODINE VAPORIZATION

[75] Inventors: David J. Benard, Albuquerque; Nicholas R. Pchelkin, Los Lunas; William E. McDermott; David E. Ellis, both of Albuquerque; George W. Miller, Rio Rancho, all of N. Mex.

[73] Assignee: The United States of America as represented by the Secretary of the Air Force, Washington, D.C.

[21] Appl. No.: 242,505

[22] Filed: Mar. 10, 1981

[51] Int. Cl.$^3$ .............................................. H01S 3/22
[52] U.S. Cl. ...................................... 372/59; 372/58; 372/56
[58] Field of Search ....................... 372/55, 59, 56, 58, 372/60

[56] References Cited

PUBLICATIONS

"Efficient Operation of a 100-W Transverse-Flow Oxygen-Iodine Chemical Laser"; Benard et al., Appl. Phys. Lett. 34 (1), Jan. 1, 1979.
"An Electronic Transition Chemical Laser"; McDermott; Appl. Phys. Lett. 32 (8), Apr. 15, 1978.

Primary Examiner—James W. Davie
Assistant Examiner—Leon Scott, Jr.
Attorney, Agent, or Firm—Donald J. Singer; Thomas L. Kundert

[57] ABSTRACT

Iodine vapor is supplied to an oxygen iodine laser by an improved iodine vaporizer. The vaporizer has a radiation transparent window and iodine crystals are contained in the vaporizer. Broad beam radiation from a variable intensity source is directed through the window into the vaporizer where it is absorbed by the iodine crystals, causing the iodine crystals to sublime. The iodine vapor is transported to the laser by a carrier gas flowed through the vaporizer. Coarse control of the iodine flow is achieved by controlling the carrier gas flow. Control of the amount of iodine vapor introduced into the carrier gas flow is achieved by varying the amount of radiation directed into the vaporizer.

4 Claims, 2 Drawing Figures

METHOD AND APPARATUS FOR IODINE VAPORIZATION

RIGHTS OF THE GOVERNMENT

The invention described herein may be manufactured and used by or for the Government of the United States for all governmental purposes without the payment of any royalty.

BACKGROUND OF THE INVENTION

The invention relates to iodine gas lasers. Oxygen-iodine transfer lasers are utilized in Government research programs pertaining to high energy lasers. A measured amount of $I_2$ vapor must be supplied to the oxygen-iodine transfer laser in order to produce lasing. Precise control of the oxygen-iodine laser requires that an adjustable and reproducible amount of $I_2$ be introduced into a carrier gas flowing to the laser, without any appreciable effect on the carrier gas flow rate.

Iodine lasers have in the past been supplied with iodine vapor by placing iodine crystals in an evacuated container. The iodine crystals at ambient temperatures or higher will sublime generating an $I_2$ vapor in the container. A carrier gas is passed through the container of iodine crystals where it mixes with the $I_2$ vapor prior to being supplied to the laser. In the past the density of the iodine vapor in the container, and thus the amount of $I_2$ added to a carrier gas flow, has been controlled by heating the container of $I_2$ crystals or by heating the $I_2$ crystals with an electrical resistance heater. This method of supplying the heat of sublimation, or vaporization, to the solid iodine has the disadvantage of there being no way of quickly changing the rate at which the $I_2$ crystals sublime.

SUMMARY OF THE INVENTION

The invention is an oxygen-iodine laser system employing an improved $I_2$ vaporizing technique. The vaporizer includes an evacuated container with $I_2$ crystals disposed therein. The heat of sublimation is supplied to the iodine crystals by directing a broad beam visible radiation (light) into the container so that the radiation strikes the $I_2$ crystals. The $I_2$ crystals absorb the radiation with a resultant rise in temperature causing vaporization of the $I_2$ crystals. The $I_2$ vapor is then transported to the laser by flowing a carrier gas through the vaporizer.

The radiation directly deposits energy at the gas/-solid interface of the subliming $I_2$ crystals. There is no need for conduction through the solid $I_2$. The rate of sublimation is controlled by varying the intensity of the radiation and the $I_2$ sublimation rate responds very quickly to changes in radiation intensity. In turn the laser output responds quickly to changes in radiation intensity. These fast responses are obtained without any variation in carrier gas flow through the container of $I_2$ crystals.

It is therefore an object of the invention to provide an iodine laser whose output can be precisely controlled by rapid changes in the amount of $I_2$ vapor supplied to the laser.

A further object of the invention is to provide an improved $I_2$ vaporizer which employs a container of $I_2$ crystals and a variable intensity external radiation source for delivering the energy needed to vaporize the $I_2$ crystals.

Other objects and advantages of the invention will become apparent to those skilled in the art when considering the following detailed description.

DESCRIPTION OF THE PREFERRED EMBODIMENT

Figure 1:
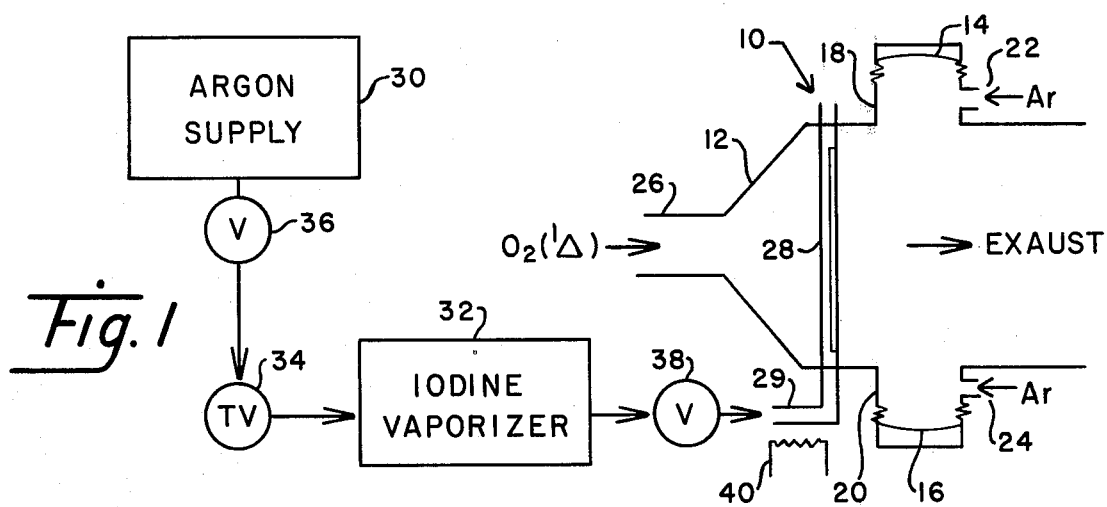
FIG. 1 is a schematic illustration of an oxygen iodine laser employing an $I_2$ vaporizer.

Referring to FIG. 1 of the drawing showing the laser system, laser 10 consists of a gradual expansion duct 12 which exhausts to a high capacity vacuum pump (not shown). Laser mirrors 14 and 16 forming the optical cavity are bellows mounted on tubes 18 and 20 extending from either side of duct 12. Mirrors 14 and 16 are protected by purging the mounting tubes 18 and 20 with a small flow of Argon (Ar) gas introduced through ports 22 and 24. A flow of excited oxygen, $O_2$ ($^1\Delta$) is introduced into duct 12 via conducit 26. Conduit 26 is connected to a suitable generator (not shown) of excited oxygen. A description of such an oxygen generator appears in the publication "Applied Physics Letters", Vol. 34, No. 1, page 4, Jan. 1, 1979, in an article entitled "Efficient Operation of a 100-W Transverse-Flow Oxygen-Iodine Chemical Laser". Molecular iodine ($I_2$) is injected into the oxygen flow through an injector 28. Injector 28 is supplied with an Ar and $I_2$ gas mixture via conduit 29. A flow of Ar from Ar supply 30 is passed through iodine vaporizer 32 where the Ar gas is seeded with $I_2$ vapor. A throttle valve 34 is provided between the argon supply and the vaporizer for controlling the Ar flowrate to the vaporizer. Valves 36 and 38 are provided for isolating the components of the system. A suitable heating means, such as resistance heater 40, can be utilized if necessary to heat conduit 29 to prevent condensation of $I_2$ on the interior of tube 29.

Figure 2:
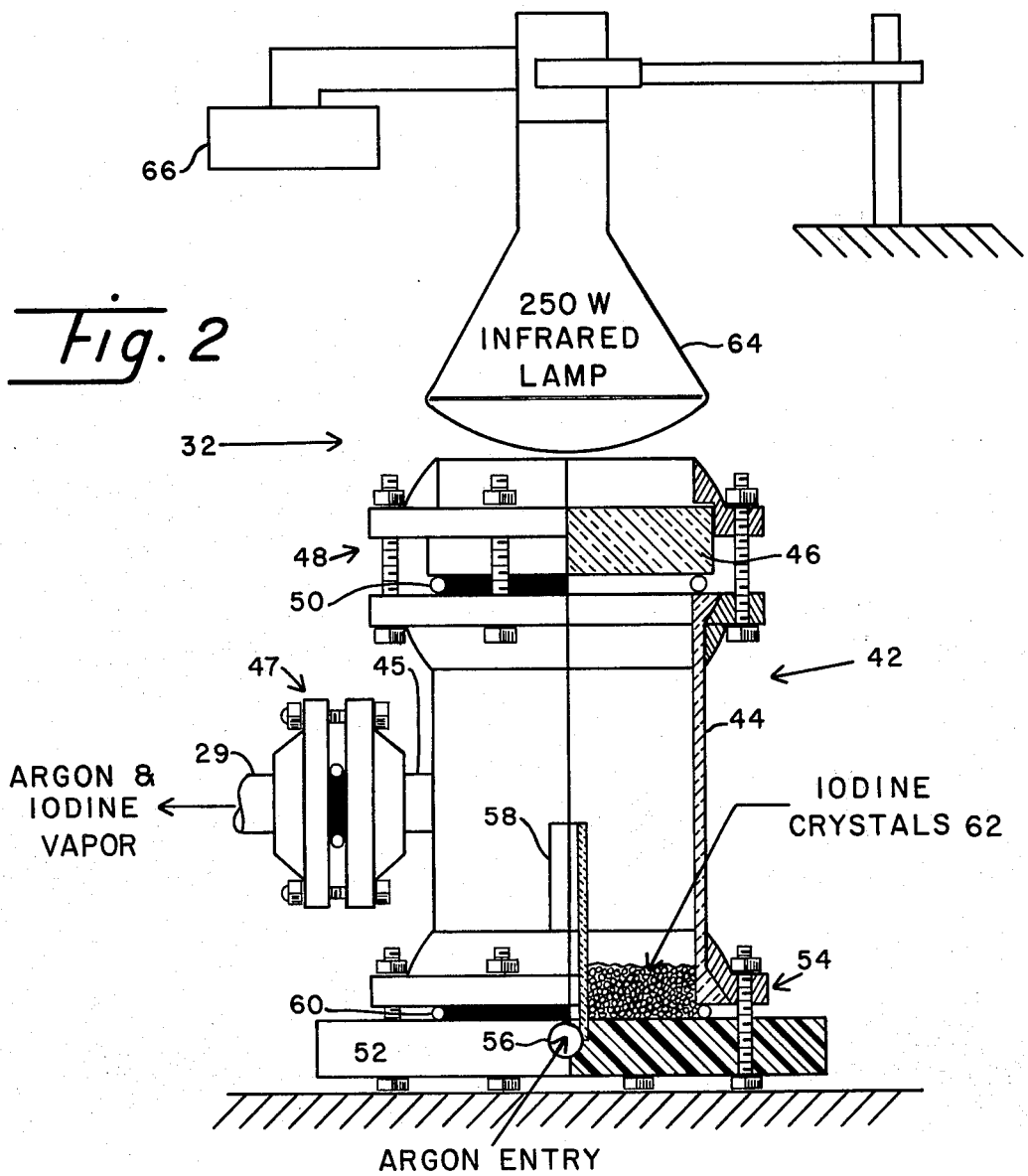
FIG. 2 is a view, partially in section, of the improved vaporizer.

FIG. 2 of the drawing illustrates the details of vaporizer 32. A container 42 is formed by a cylindrical member 44 having an outlet tube 45 extending therefrom. Tube 45 is connected to conduit 29 by flange assembly 47. In actual tests of this invention, cylindrical member 44 was a 4 inch ID Corning Glass tee reducer. The upper end of cylindrical member 44 is closed by a Corning Glass end plate 46 secured in place by metal flange and bolt assembly 48 and sealed by seal 50. The bottom end of cylinder 44 is closed by a Teflon block 52 secured in place by flange and bolt assembly 54. Ar gas from supply 30 enters cylinder 44 via entry passageway 56 formed in Teflon block 52. The entry passageway in block 52 is continued up into the vaporizer by a glass tube 58 mounted in passageway 56 and centrally disposed in cylinder 44. Seal 60 seals between block 52 and cylinder 44. A suitable quantity of iodine crystals 62 is placed in cylinder 44.

A suitable radiation heat source, such as infrared lamp 64, is mounted adjacent vaporizer 32. Lamp 64 is oriented such that radiation therefrom passes through glass end plate 46 and strikes the iodine crystals 62 causing them to sublime. The output of lamp 64 can be controlled by a 110 VAC VARIAC 66. The output of lamp 64 controls the amount of iodine vapor present in cylinder 44 and thus the quantity of iodine vapor added to the Ar gas flowing to the laser. This in turn affects the operation of the laser.

During operation of the invention, and without any variation in the rate of Ar gas flow or the flow of excited oxygen, it was found that the output of the laser would respond very rapidly (2 seconds) to changes in the output intensity of lamp 64.

While a preferred embodiment of the invention has been described herein there will be changes and modifications which can be made without departing from the invention.

We claim:

1. A gas laser system including a laser apparatus having a lasing cavity, a source of a first active gas mixture connected to said laser apparatus so as to supply said first active gas to said lasing apparatus, an adjustable supply of a carrier gas, an improved vaporizing means connected to said lasing apparatus and said supply of carrier gas for supplying a second active gas that is mixed with said first active gas prior to entry into said lasing cavity to provide a lasing medium therein, said improved vaporizing means comprising:

a. a closed container having an inlet port connected to said supply of carrier gas for receiving a regulated flow of gas therefrom, an outlet port connected to said lasing apparatus, and a window section that is transparent to broad beam visible radiation;
   b. $I_2$ crystal material disposed within said container in a position to receive radiation through said window section; and
   c. an adjustable source of infrared radiation mounted so as to direct radiation through said window section into said container to vaporize said $I_2$ crystal material and form a gas/solid interface therein that provides a source of vapor that mixes with said carrier gas to provide said second active gas supplied to said lasing cavity, said infrared radiation depositing energy at the gas/solid interface to cause the rate of sublimation of said vaporizable $I_2$ crystal material to respond to changes in radiation intensity to control the flow of said second active gas.

2. The gas laser system recited in claim 1 wherein said carrier gas is argon.

3. A method of providing an active component gas for the lasing medium of a gas laser comprising the steps of:

a. placing a $I_2$ crystal substance in a closed container;
   b. irradiating said $I_2$ crystal substance by an adjustable source of infrared radiation to cause a controlled amount of said $I_2$ crystal substance to form a vapor in said container;
   c. flowing a carrier gas through said container that combines with said vapor to form said active component gas; and
   d. transporting said active component gas to the lasing medium.

4. The method recited in claim 3 wherein said carrier gas is argon.

* * * * *